United States Patent
Kuno

(10) Patent No.: US 8,885,222 B2
(45) Date of Patent: Nov. 11, 2014

(54) IMAGE PROCESSING APPARATUS PERFORMING ERROR DIFFUSION PROCESS

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 219 days.

(21) Appl. No.: 13/354,173

(22) Filed: Jan. 19, 2012

(65) Prior Publication Data

US 2012/0188609 A1 Jul. 26, 2012

(30) Foreign Application Priority Data

Jan. 21, 2011 (JP) .................. 2011-011291

(51) Int. Cl.
- H04N 1/40 (2006.01)
- H04N 1/409 (2006.01)
- H04N 1/405 (2006.01)
- G06K 15/02 (2006.01)

(52) U.S. Cl.
CPC .............. *H04N 1/409* (2013.01); *H04N 1/4092* (2013.01); *H04N 1/4051* (2013.01); *G06K 15/188* (2013.01)
USPC ....... 358/3.05; 358/3.03; 358/3.04; 358/3.06; 358/3.24; 358/3.26; 358/3.27

(58) Field of Classification Search
CPC ....... H04N 1/58; H04N 1/409; H04N 1/4092; H04N 1/405; H04N 1/4051; H04N 1/4052
USPC .............................. 358/3.03–3.05, 3.26–3.27; 382/254–269
See application file for complete search history.

(56) References Cited

U.S. PATENT DOCUMENTS

| | | | | |
|---|---|---|---|---|
| 5,436,736 A | * | 7/1995 | Shono | 358/3.19 |
| 5,506,698 A | | 4/1996 | Nishihara | |
| 5,530,561 A | * | 6/1996 | Shimazaki | 358/3.03 |
| 5,610,999 A | * | 3/1997 | Bannai et al. | 382/272 |
| 5,805,738 A | * | 9/1998 | Kaburagi et al. | 382/251 |
| 5,809,177 A | * | 9/1998 | Metcalfe et al. | 382/251 |

(Continued)

FOREIGN PATENT DOCUMENTS

| JP | H07-093534 A | 4/1995 |
|---|---|---|
| JP | H11-188898 A | 7/1999 |

(Continued)

OTHER PUBLICATIONS

Watanabe et al., "Inkjet Recorder", published Nov. 19, 2003, JPO Machine Translation.*

(Continued)

*Primary Examiner* — Richard Zhu

(74) *Attorney, Agent, or Firm* — Baker Botts L.L.P.

(57) ABSTRACT

An image processor includes a color conversion unit that generates color converted image data by converting color data and an error diffusion process performing unit that generates print data by performing an error diffusion process on the color converted image data. The error diffusion process performs a first error diffusion process on remaining data and performing a second error diffusion process on edge data such that an amount of ink used in the edge region by performing the second error diffusion process on the edge data is less than an amount of ink used in the edge region by performing first error diffusion process on the edge data.

8 Claims, 12 Drawing Sheets

(56) References Cited

U.S. PATENT DOCUMENTS

| | | | |
|---|---|---|---|
| 6,089,691 A | 7/2000 | Kakutani | |
| 6,099,105 A | 8/2000 | Kakutani | |
| 6,149,327 A | 11/2000 | Ward et al. | |
| 7,369,710 B2* | 5/2008 | Yoshida | 382/252 |
| 7,651,206 B2* | 1/2010 | Hawkins et al. | 347/73 |
| 8,353,569 B2 | 1/2013 | Takahashi et al. | |
| 2002/0051023 A1 | 5/2002 | Teshigawara et al. | |
| 2002/0080377 A1* | 6/2002 | Tonami et al. | 358/1.9 |
| 2003/0043219 A1 | 3/2003 | Kojima | |
| 2003/0169320 A1 | 9/2003 | Tomotake et al. | |
| 2004/0174566 A1* | 9/2004 | Akahori | 358/2.1 |
| 2005/0200899 A1* | 9/2005 | Kuwahara | 358/3.03 |
| 2006/0023011 A1* | 2/2006 | Hawkins et al. | 347/12 |
| 2006/0098232 A1* | 5/2006 | Nakano et al. | 358/3.26 |
| 2006/0103688 A1 | 5/2006 | Hirano | |
| 2006/0125852 A1 | 6/2006 | Yamakado | |
| 2006/0164492 A1* | 7/2006 | Brookmire et al. | 347/104 |
| 2008/0094436 A1 | 4/2008 | Kakutani et al. | |
| 2008/0094651 A1 | 4/2008 | Takahashi | |
| 2008/0144059 A1* | 6/2008 | Nagai | 358/1.9 |
| 2010/0156979 A1 | 6/2010 | Takahashi et al. | |
| 2010/0165032 A1 | 7/2010 | Toshida | |
| 2012/0062908 A1 | 3/2012 | Kuno | |
| 2012/0188561 A1 | 7/2012 | Kuno | |

FOREIGN PATENT DOCUMENTS

| | | |
|---|---|---|
| JP | 2002-200745 A | 7/2002 |
| JP | 2003-062984 A | 3/2003 |
| JP | 2003-237062 A | 8/2003 |
| JP | 4154899 B2 | 8/2003 |
| JP | 2003-300312 A | 10/2003 |
| JP | 2003-326747 A | 11/2003 |
| JP | 2006-082266 A | 3/2006 |
| JP | 2007-088927 A | 4/2007 |
| JP | 2007-118380 A | 5/2007 |
| JP | 2010-162882 A | 7/2010 |
| JP | 2011-000716 A | 1/2011 |
| WO | 98/03341 A1 | 1/1998 |

OTHER PUBLICATIONS

Japan Patent Office, Office Action for Japanese Patent Application No. 2011-011290 (counterpart Japanese patent application), mailed Feb. 5, 2013.

Japan Patent Office, Office Action for Japanese Patent Application No. 2011-011291 (counterpart Japanese patent application), mailed Feb. 5, 2013.

Japan Patent Office, Office Action for Japanese Patent Application No. 2011-011291 (counterpart to above-captioned patent application), mailed May 7, 2013.

* cited by examiner

FIG. 6B

| | REFERENCE THRESHOLD VALUE | | | RELATIVE VALUE | | |
|---|---|---|---|---|---|---|
| | SMALL | MEDIUM | LARGE | SMALL | MEDIUM | LARGE |
| FIRST ERROR DIFFUSSION PROCESS (K INK OR EXCEPT EDGE RASTER) | 0 | 91 | 127 | 91 | 127 | 255 |
| SECOND ERROR DIFFUSSION PROCESS (CMY INK OR EDGE RASTER) | 0 | 91 | 127 | 182 | 254 | 510 |

FIG. 6C

| | REFERENCE THRESHOLD VALUE | | | RELATIVE VALUE | | |
|---|---|---|---|---|---|---|
| | SMALL | MEDIUM | LARGE | SMALL | MEDIUM | LARGE |
| FIRST ERROR DIFFUSSION PROCESS (K INK OR EXCEPT EDGE RASTER) | 0 | 16 | 64 | 91 | 127 | 255 |
| SECOND ERROR DIFFUSSION PROCESS (CMY INK OR EDGE RASTER) | 0 | 91 | 127 | 91 | 127 | 255 |

FIRST TABLE

SECOND TABLE

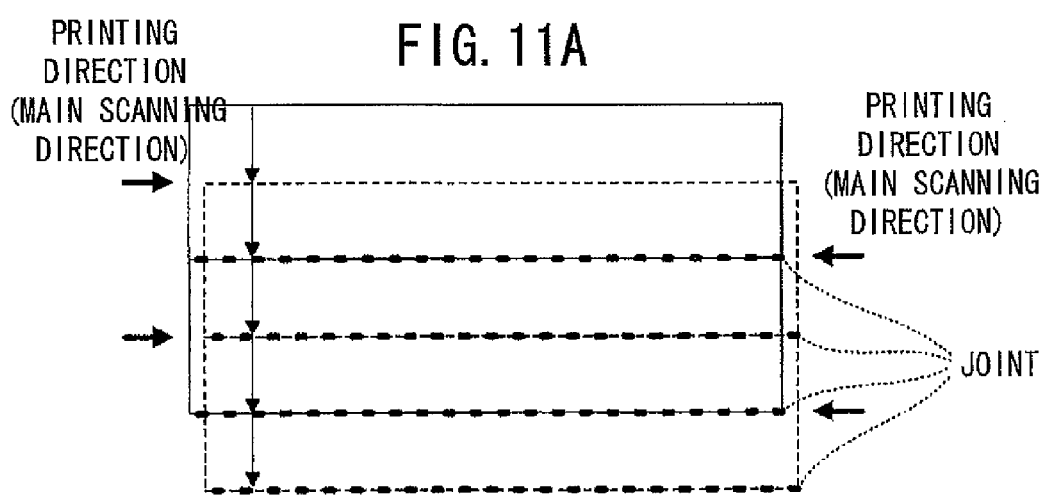
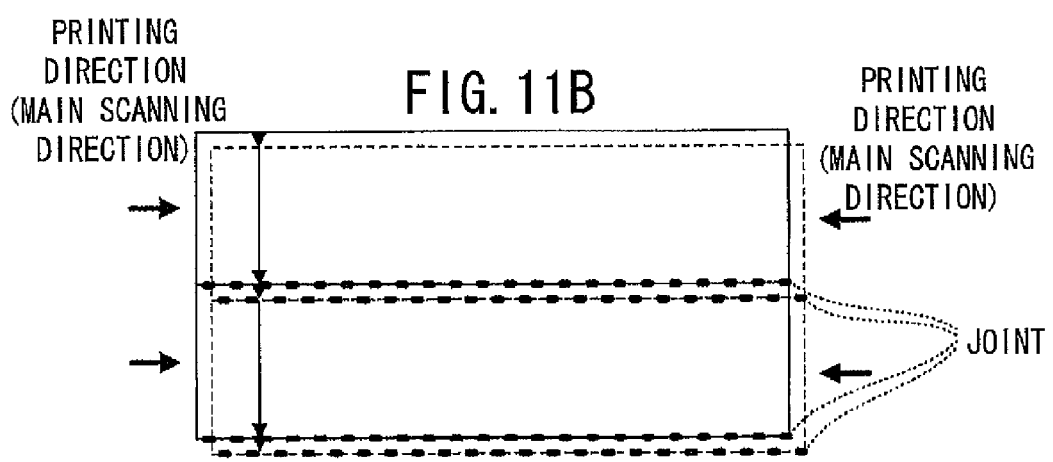

IMAGE PROCESSING APPARATUS PERFORMING ERROR DIFFUSION PROCESS

CROSS REFERENCE TO RELATED APPLICATION

This application claims priority from Japanese Patent Application No. 2011-011291 filed Jan. 21, 2011. The entire content of the priority application is incorporated herein by reference.

TECHNICAL FIELD

The present invention relates to an image process technique for generating print data.

BACKGROUND

There is conventionally known an ink-jet type printer that scans a print head having a nozzle array for ejecting ink droplets in the main scanning direction perpendicular to the nozzle array and, at the same time, ejects ink droplets from the nozzle array onto a paper sheet, thereby printing an image onto the paper sheet.

A printer of such a type can print an image corresponding to a band-like print area (band) that is a unit area for printing and has the same width as the nozzle width (length of the nozzle array) in a single main scan of the print head. To print an image onto an area wider than a single band (e.g., a sheet of paper), band-by-band image print operation is repeated while the position of a paper sheet is shifted in the sub-scanning direction.

The number of gradations that can be expressed by ink droplets ejected from the print head is smaller than the number (e.g., 256 gradations) of gradations of an original image data corresponding to an image to be printed. Thus, ejection of the ink droplets by the print head is performed based on print data with a small number of gradations generated by halftone process.

There exists a problem with the image printed in such a printer that a high-density streak can be generated at the joint between adjacent two bands printed through different main scans. In order to cope with this problem, there has been proposed a technique in which pixels around the joint in the print data after halftone process are thinned or a technique in which the diameter rank of ink droplets corresponding to pixels around the joint area is reduced to reduce the ink amount. That is, in these techniques, the print data after halftone process is subjected to a reduction in the amount of ink to be used for printing the area around the joint between the two bands printed through different main scans so as to reduce the streak that can be generated around the joint.

SUMMARY

There has been a demand that the streak that can be generated in the joint between the two unit print areas (bands) printed through different main scans is reduced using another technique.

An object of the invention is to provide another technique for reducing the streak that can be generated in the joint between the two unit print areas (bands) printed through different main scans.

In order to attain the above and other objects, the invention provides an image processing apparatus. The image processing apparatus includes a processor configured to function as a color conversion unit, and an error diffusion process performing unit. The color conversion unit is configured to generate color converted image data by performing a color conversion process on original image data. The color converted data includes part data corresponding to a unit region on a recording sheet. The unit region is to be printed while one main scanning in which a print head moves in a main scanning direction. The part data includes edge data corresponding to an edge region of the unit region and remaining data corresponding to a remaining region other than the edge region in the unit region. The error diffusion process performing unit is configured to generate print data by performing an error diffusion process on the color converted image data. The error diffusion process performs a first error diffusion process on the remaining data and performing a second error diffusion process on the edge data such that an amount of ink to be used in the edge region by performing the second error diffusion process on the edge data becomes reduced than when an amount of ink to be used in the edge region by performing first error diffusion process on the edge data. The supplying unit is configured to supply the corrected print data.

According to another aspect, the present invention provides a non-transitory computer readable storage medium storing a set of program instructions installed on and executed by a computer. The program instructions includes: (a) generating color converted image data by performing a color conversion process on original image data, where the color converted data including part data corresponds to a unit region on a recording sheet, where the unit region is to be printed while one main scanning in which a print head moves in a main scanning direction, and where the part data includes edge data corresponding to an edge region of the unit region and remaining data corresponding to a remaining region other than the edge region in the unit region; (b) generating print data by performing an error diffusion process on the color converted image data, the error diffusion process performing a first error diffusion process on the remaining data and performing a second error diffusion process on the edge data such that an amount of ink to be used in the edge region by performing the second error diffusion process on the edge data becomes reduced than when an amount of ink to be used in the edge region by performing first error diffusion process on the edge data; and (c) supplying the corrected print data.

BRIEF DESCRIPTION OF THE DRAWINGS

In the drawings:

FIG. 6B is a table correlating a reference threshold value to a relative value used in the first embodiment;

FIG. 6C is a table correlating a reference threshold value to a relative value used in the second embodiment;

FIG. 11A is an explanatory diagram illustrating streak generated by two pass printing in which a paper conveyance amount is even; and FIG. 11B is an explanatory diagram illustrating streak generated by two pass printing in which a paper conveyance amount is uneven.

DETAILED DESCRIPTION

1. First Embodiment 1-1. Configuration

Figure 1:
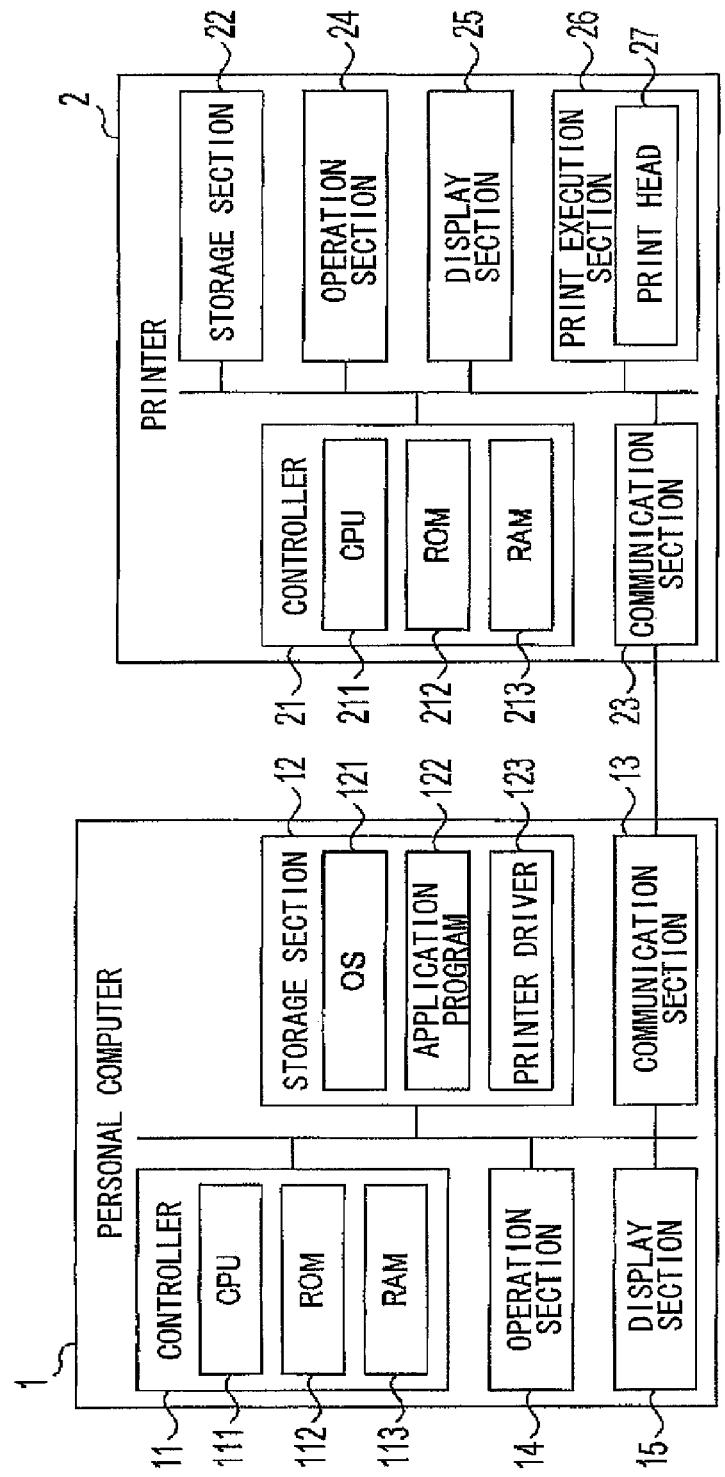
FIG. 1 is a block diagram schematically illustrating a configuration of a print system according to a first embodiment.

FIG. 1 is a block diagram schematically illustrating a configuration of a print system according to a first embodiment. The print system includes a personal computer 1 and a printer 2 configured to be able to perform data communication with each other.

The personal computer 1 is a general-purpose information processor and includes a controller 11, a storage section 12, a communication section 13, an operation section 14, and a display section 15.

The controller 11 overall-controls respective components of the personal computer 1 and includes a CPU 111, a ROM 112, and a RAM 113. The storage section 12 is a non-volatile storage device that can rewrite its stored data. In the first embodiment, a hard disk drive is used as the storage section 12. An operating system (OS) 121, an application program 122 such as a graphic tool, and a printer driver 123 which is software (program) for allowing the personal computer 1 to utilize the printer 2 are installed in the storage section 12. The communication section 13 is an interface for performing data communication with the printer 2. The operation section 14 is an input device for a user to input a command. In the first embodiment, a keyboard or a pointing device (mouse, touchpad, etc.) is used as the operation section 14. The display section 15 is an output device for displaying various information as a user-viewable image. In the embodiment, a liquid crystal display is used as the display section 15.

The printer 2 is an ink-jet type printer and includes a controller 21, a storage section 22, a communication section 23, an operation section 24, a display section 25, and a print execution section 26.

The controller 21 overall-controls respective components of the printer 2 and includes a CPU 211, a ROM 212, and a RAM 213. The storage section 22 is a non-volatile storage device that can rewrite its stored data. In the embodiment, a flash memory is used as the storage section 22. The communication section 23 is an interface for performing data communication with the personal computer 1. The operation section 24 is an input device for a user to input a command and is provided with various operation buttons. The display section 25 is an output device for displaying various information as a user-viewable image. A small liquid crystal display is used as the display section 25.

Figure 2A:
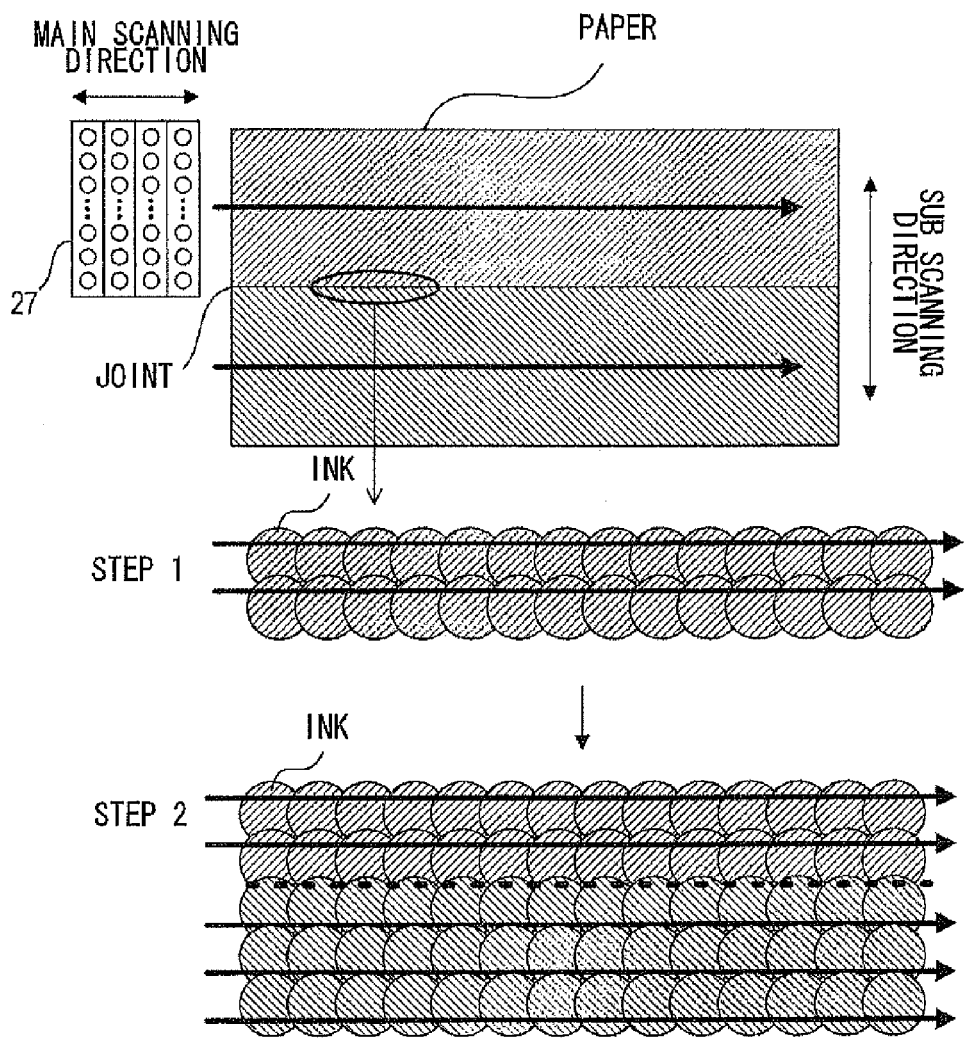
FIG. 2A is an explanatory diagram illustrating streak generated by one pass printing.

The print execution section 26 includes a print head 27 that can reciprocate in the direction (main scanning direction) perpendicular to the conveyance direction (sub-scanning direction) of a paper sheet as a print medium and prints an image onto the paper sheet by ejecting ink droplets based on print data during reciprocation of the print head 27. Nozzles for ejecting ink droplets of respective colors of cyan (C), magenta (M), yellow (Y), and black (K) are arranged in an array on the lower surface (surface facing the paper sheet) of the print head 27 along the sub-scanning direction, and four nozzle arrays are formed as a whole (refer to FIG. 2A, here, though in FIG. 2A the print head 27 is viewed from the opposite side to a surface on which the nozzle arrays are formed and thus the nozzle arrays cannot be viewed actually in this state, FIG. 2A shows the nozzle arrays for explaining the position of the ink dropped from the nozzle arrays).

In the printer 2 according to the embodiment, dye inks are used for C, M, and Y, respectively, and a pigment ink is used for K. The dye ink easily permeates into fibers of the paper sheet. The pigment ink is hard to permeate into the inside of the paper sheet but fixed to the paper surface, and thus the pigment ink is poor in fixing performance to a gloss paper sheet while superior in sharpness of characters with respect to a regular paper sheet.

The print execution section 26 performs ink droplet control based on print data in which each pixel constituting an image is expressed by four gradation levels in order to express shading more naturally. In the embodiment, adjusting the ink droplet ejection amount in a plurality of levels allows four gradation levels of large dot, medium dot, small dot, and no dot to be expressed.

1-2. Outline of Processing

The outline of processing executed in the print system according to the first embodiment will be described. In the personal computer 1, print start operation is executed in the running application program 122, and the printer driver 123 is activated. Upon activation of the printer driver 123, the controller 11 of the personal computer 1 executes the following processing of (A) to (C) as image process for allowing the printer 2 to print a target image.

Figure 3:
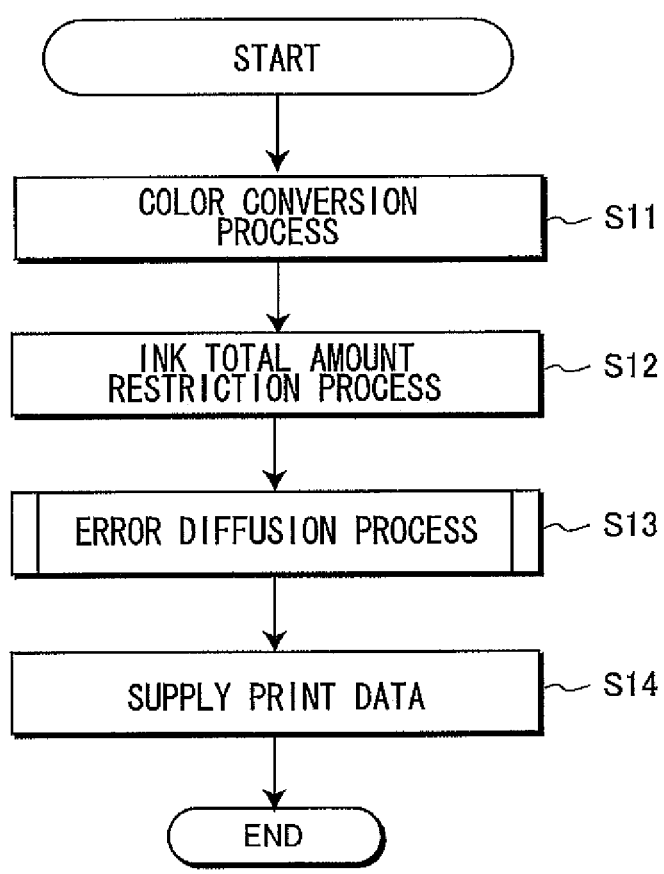
FIG. 3 is a flowchart illustrating a process executed by a personal computer as a function of a printer driver.

(A) Image process including color conversion process is applied to image data (original image data) expressed in RGB values of 256 gradation levels (RGB values each ranging from 0 to 255 (8-bit range)) expressing a target image to be printed to generate color-converted image data expressed in CMYK values of 256 gradation levels (processing of S11 and S12 in FIG. 3 to be described later).

(B) Error diffusion process is applied to the color-converted image data to generate print data expressed in CMYK values of four gradation levels (processing of S13 in FIG. 3 to be described later).

(C) The generated print data is supplied to the printer 2 (processing of S14 in FIG. 3 to be described later).

After execution of the above processing (A) to (C) on the personal computer 1, the printer 2 prints, at the print execution section 26, an image expressed by the print data supplied from the personal computer 1. Specifically, the printer 2 ejects ink droplets from the nozzle based on the print data while moving the print head 27 of the print execution section 26 in the main scanning direction to print an image corresponding to a band-like print area (hereinafter, simply referred to as band) that is a unit area for printing and has the same width as the nozzle width (length of the nozzle array in the sub-scanning direction) in a single main scan of the print head. That is, the image is printed on the band while the print head ejects ink during one main scan. Then, the printer 2 alternately performs reciprocation of the print head 27 and conveyance of a paper sheet in the sub-scanning direction so that band-by-band image print operation is repeated while the position of a paper sheet is shifted in the sub-scanning direction, whereby the image is printed on the entire paper surface.

Figure 2B:
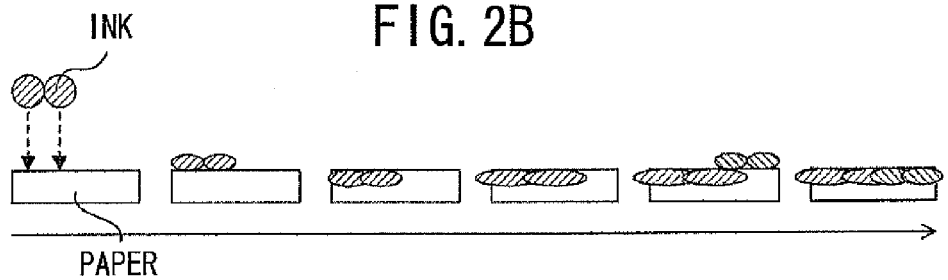
FIG. 2B is an explanatory diagram illustrating a reason that the streak is generated.

In one-pass printing in which the paper sheet is conveyed by the nozzle width for each main scan (one pass) of the print head 27 to complete printing of an image of a predetermined area in a single main scan (one pass), a high-density streak may be generated at the joint between adjacent two bands on the paper sheet. That is, in the one-pass printing, a band on the upper side of the joint is printed first as illustrated in FIG. 2A (step 1) and then a band on the lower side of the joint is printed (step 2). At this time, as illustrated in FIG. 2B, the lower edge portions (corresponding to the joint with the lower-side band) of the ink droplets of the upper-side band are permeated into the paper sheet to increase the area where the ink droplets are overlapped, which seems to be a cause of the generation of the streak.

In order to cope with the above problem, in the embodiment, the personal computer 1 performs the above described error diffusion process (B) for reducing the total amount of ink used in the area corresponding to the joint between the bands, so as to make the streak less likely to occur.

1-3. Concrete Explanation of Process

A concrete process that the controller 11 (CPU 111) of the personal computer 1 executes as the function of the printer driver 123 will be described using the flowchart of FIG. 3.

In S11, the controller 11 performs color conversion process to generate image data expressed by CMYK values of 256 gradation levels corresponding to ink colors (CMYK) used in the printer 2 for printing, from original image data expressed by RGB values of 256 gradation levels expressing an image to be printed. This color conversion process is performed according to a previously stored look-up table (RGB→CMYK).

Subsequently, in step S12, the controller 11 performs ink total amount restriction process with respect to all the pixels constituting the image data after the color conversion process such that the total sum of the CMYK values becomes less than or equal to a restriction value. This ink total amount restriction process is performed according to a previously stored look-up table (CMYK→CMYK).

Then, in step S13, the controller 11 performs an error diffusion process to generate image data (print data) expressed in CMYK values of four gradation levels that can be expressed by the printer 2 from the image data (image data expressed in CMYK values of 256 gradation levels) that has been subjected to the ink total amount restriction process. In this error diffusion process, the controller 11 performs process of reducing the total amount of ink to be used for printing the rear edge raster of the band (raster at the edge of a first band on the side adjacent to a second band to be printed later than the first band). The details of the error diffusion process will be described later.

In S114, the controller 11 performs print data supply processing to supply the print data that has been subjected to the halftone process (error diffusion process) to the printer 2. As a result, in the print execution section 26 of the printer 2, an image based on the print data is printed on a paper sheet.

Figure 4:
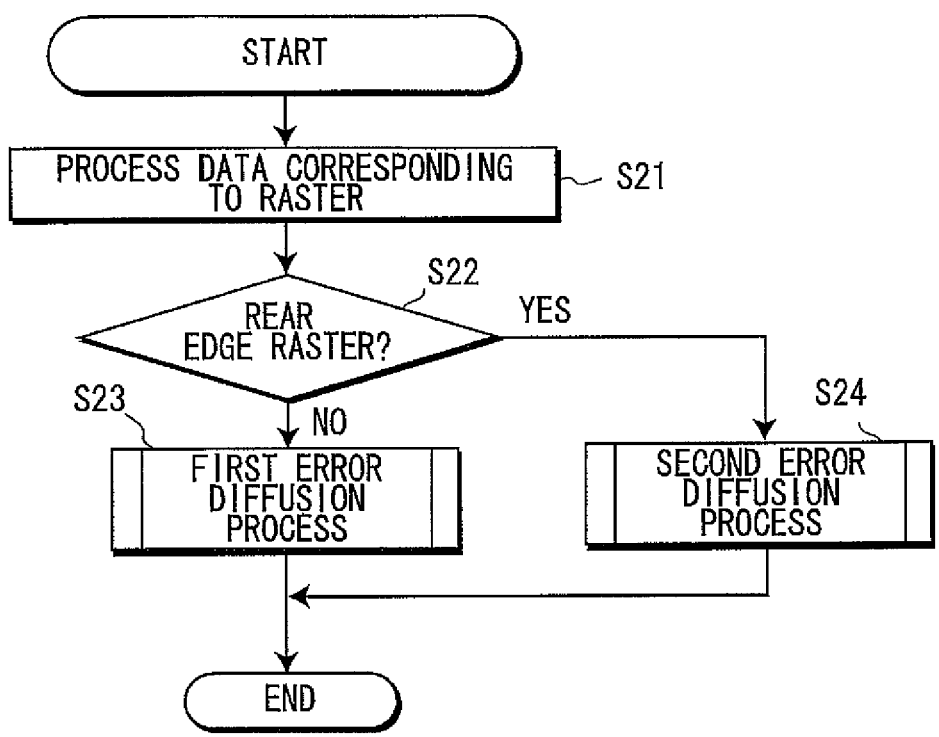
FIG. 4 is a flowchart illustrating a process using two different error diffusion processes.

The error diffusion process performed in step S13 will be described. As illustrated in a flowchart of FIG. 4, the manner of the error diffusion process differs depending on whether partial data corresponding to the band in the image data to be processed is line image data corresponding to the rear edge raster of the band or other image data.

That is, in S21 the image data to be processed is subjected to the above image process for each line image data corresponding to a raster (one line). When the line image data to be processed does not correspond to the rear edge raster (S22: No), in S23 the controller 11 performs a first error diffusion process. On the other hand, when the line image data to be processed corresponds to the rear edge raster (S22: Yes), in S24 the controller 11 performs a second error diffusion process with reduced ink amount as compared to the ink amount used in the first error diffusion process. However, in the embodiment, since pigment ink is used as K ink, the first error diffusion process (S23) is performed for the value of K (black) even when the line image data to be processed corresponds to the rear edge raster, which will be described later. The process of S21 corresponds to the above-mentioned color conversion process (S11) and the ink total amount restriction process (S12). The controller 11 can determine whether the line image data to be processed corresponds to the rear edge raster or not based on acquisition of nozzle numbers (nozzle numbers to be used) of the print head 27 assigned to the line image data.

The details of the error diffusion process performed in S22 to S24 will be described using a flowchart of FIG. 5 and a process block diagram of FIG. 6A. In the error diffusion process of FIG. 5, pixels constituting image data to be processed are sequentially selected as a target pixel (pixel to be processed), and the process is executed for each pixel.

After starting the error diffusion process of FIG. 5, the controller 11 determines in S101 whether process step S102 and subsequent steps (to be described later) have been executed for all the CMYK values (color values each indicating gradation of each of four colors) of the target pixel. When the controller 11 determines that there is any unprocessed color value (S101: No), the controller 11 selects one of the unprocessed color values as an input value and thereafter advances to S102.

Figure 6A:
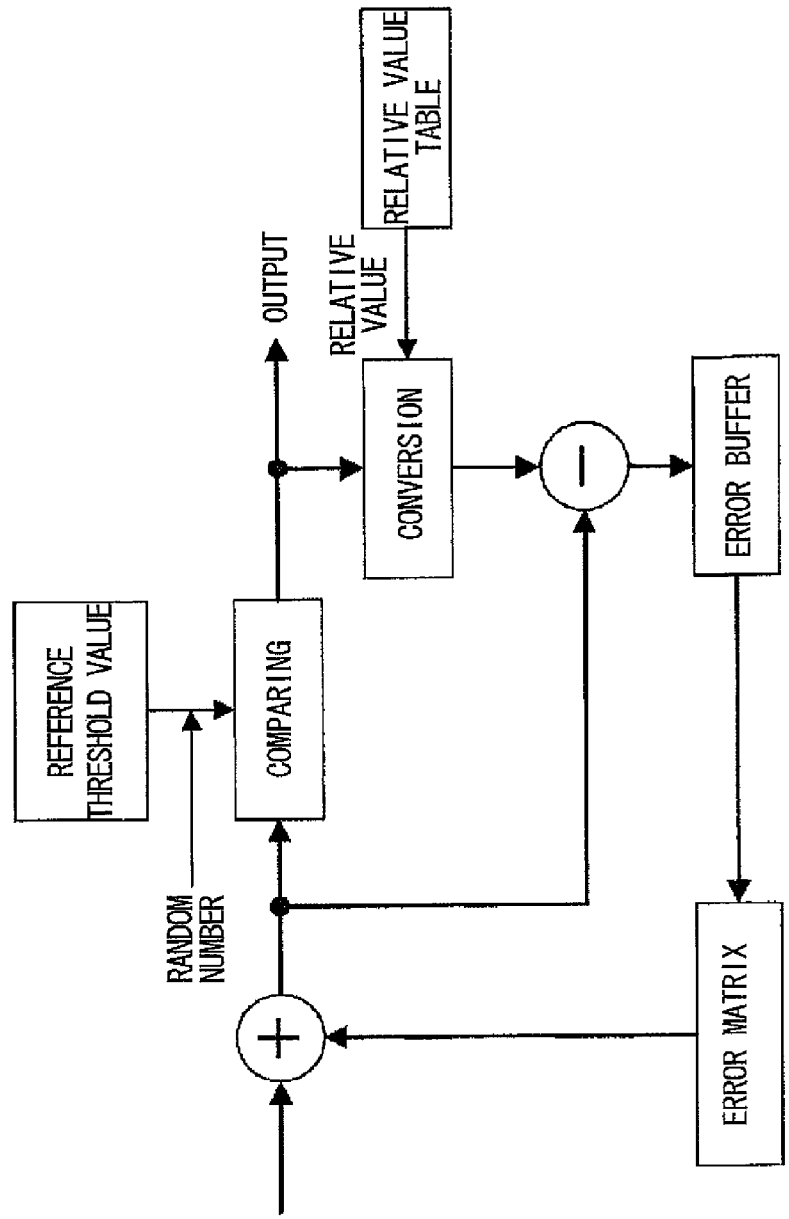
FIG. 6A is a block diagram illustrating the error diffusion process.

In S102, the controller 11 uses an error matrix to collect error values from an error buffer and adds the collected error values to an input value to calculate a corrected input value (FIG. 6A). The error matrix is a matrix in which weighting factors according to the relative position with respect to the target pixel are set for a plurality of pixels (processed pixels) around the target pixel. In S102, the error value (value stored in S114 to be described later) of each surrounding pixel stored in the error buffer and weighting factor set for the surrounding pixel are multiplied. Then, a value obtained by dividing the total sum of the calculated values of all the surrounding pixels by the total sum of the weighting factors is added as the collected error value to the input value.

Subsequently, in S103, the controller 11 acquires a random number occurring within an amplitude range of ±64 (−64 to +64). The random number acquired here is a value to be added to a small threshold value, a medium threshold value, and a large threshold value (small threshold value<medium threshold value<large threshold value) which are previously set three-level reference thresholds. These reference threshold values are used for converting the corrected input values into data of output dots (large dot, medium dot, small dot, or no dot), in other words, sorts each of the input values to one of the four-level dot values. In the embodiment, as illustrated in FIG. 6B, the small threshold value is set to 0, medium threshold value is to 91, and large threshold value to 127.

In step S104, the controller 11 determines whether the corrected input value is larger than a corrected large threshold value obtained by adding the random number acquired in S103 to the large threshold value. That is, the controller 11 compares the corrected input value with corrected large threshold value (FIG. 6A). When the controller 11 determines that the corrected input value is larger than the corrected large threshold value (S104: Yes), the controller 11 advances to S105 and determines the output dot of the target pixel as large dot. Thereafter, the controller 11 advances to S111.

On the other hand, when the controller 11 determines that the corrected input value is not larger than the corrected large threshold value (S104: No), the controller 11 advances to S106 and then determines whether the corrected input value is larger than a corrected medium threshold value obtained by adding the random number acquired in S103 to the medium threshold value. That is, the controller 11 compares the corrected input value with corrected medium threshold value (FIG. 6A). When the controller 11 determines that the corrected input value is larger than the corrected medium threshold value (S106: Yes), the controller 11 advances to S107 and determines the output dot of the target pixel as medium dot. Thereafter, the controller 11 advances to S111.

On the other hand, when the controller 11 determines that the corrected input value is not larger than the corrected medium threshold value (S106: No), the controller 11 advances to S108 and then determines whether the corrected input value is larger than a corrected small threshold value obtained by adding the random number acquired in S103 to the small threshold value. That is, the controller 11 compares the corrected input value with corrected small threshold value (FIG. 6A). When the controller 11 determines that the corrected input value is larger than the corrected small threshold value (S108: Yes), the controller 11 advances to S109 and determines the output dot of the target pixel as small dot. Thereafter, the controller 11 advances to S111.

On the other hand, when the controller 11 determines that the corrected input value is not larger than the corrected small threshold value (S108: No), in S110 the controller 11 determines the output dot of the target pixel as no dot and then advances to S111.

In S111, the controller 11 determines whether the target pixel belongs to the rear edge raster of the band and whether the input value to be processed is any one of CMY color values. When the controller 11 determines that the target pixel does not belong to the rear edge raster of the band or that the input value to be processed is K color value (S111: No), the controller 11 advances to S112 and converts the output dot of the target pixel into a first relative value (FIG. 6A). Thereafter, the controller 11 advances to S114. The first relative value is a value obtained by converting the output dot into a range of the input value. The first relative values are previously registered in a relative value table (FIG. 6A). That is, as shown in FIG. 6A, the first relative values are relative values corresponding to and used by the first error diffusion process. Specifically, as illustrated in FIG. 6B, the first relative values of small dot, medium dot, and large dot are set to 91, 127, and 255, respectively. That is, the first relative value of large dot is set to 255 which is the largest value representable as an 8-bit binary number, and those of medium dot and small dot are set according to the density ratio relative to large dot. Further, second relative values set larger than the first relative values are registered in the relative value table. The second relative values are relative values corresponding to and used by the second error diffusion process. Specifically, the second relative values are double the first relative values (small dot: 182, medium dot: 254, and large dot:510). The relative values (first and second relative values) of no dot are set to zero.

On the other hand, when the controller 11 determines that the target pixel belongs to the rear edge raster of the band and that the input value to be processed is any one of CMY color values (S111: Yes), the controller 11 advances to S113 and converts the output dot of the target pixel into the corresponding second relative value (FIG. 6A). Thereafter, the controller 11 advances to S114.

In S114, the controller 11 registers in the error buffer a value obtained by subtracting the relative value obtained in S112 or S113 from the corrected input value as the error value of the target pixel (FIG. 6A). Thereafter, the controller 11 returns to S101. Then, in S101, when the controller 11 determines that step S102 and subsequent steps have been executed for all the CMYK values (four color values) of the target pixel (there is no unprocessed color value), the controller 11 ends the error diffusion process of FIG. 5.

1-4. Effect

As described above, according to the first embodiment, the second relative values larger than the first relative values are used for the CMY values of the edge image data corresponding to the rear edge raster of the band in the error diffusion process. Thus, the amount of the CMY ink to be used for printing the rear edge raster of the band can be reduced, thereby reducing the streak that can be generated at the joint between two bands printed through different two main scans. In particular, reduction of the ink use amount in the error diffusion process eliminates the need to perform extra processing when compared to a case where the ink use amount reduction is performed before (at the stage of the color conversion process) or after the error diffusion process. That is, a reduction in the ink use amount can be achieved with slight alteration of the error diffusion process.

Although the K (black) ink is not subjected to a reduction in use amount in the error diffusion process of the embodiment, the pigment ink (K ink) is unlikely to generate the streak at the joint between the bands. That is, as described above, the dye ink easily permeates into fibers of the paper sheet to easily generate the streak, while the pigment ink is hard to permeate into the inside of the paper sheet but fixed to the paper sheet surface, making the pigment ink unlikely to generate the streak. In the case of the pigment ink, a reduction in the amount of the ink disadvantageously results in a visible white line due to the absence of permeation. Therefore, the print quality can be enhanced without reducing the amount of the pigment ink but by reducing the amount of the dye ink.

2. Second Embodiment

2-1. Difference from Print System of First Embodiment

A print system according to a second embodiment is similar to that according to the first embodiment but differs therefrom in the details of the error diffusion process. That is, in the first embodiment, the first relative values are used in the first error diffusion process, and second relative values larger than the first relative values are used in the second error diffusion process. In the second embodiment, first reference threshold values are used in the first error diffusion process, and second reference threshold values larger than the first reference threshold values are used in the second error diffusion process. Specifically, as illustrated in FIG. 6C, the first reference threshold values (upper column of FIG. 6C) for small threshold value, medium threshold value, and large threshold value are set to 0, 16, and 64, respectively, and the second reference threshold values (lower column of FIG. 6C) for small threshold value, medium threshold value, and large threshold value are set to 0, 91, and 127, respectively. Hereinafter, the same descriptions as the first embodiment are omitted.

2-2. Error Diffusion Process

Figure 5:
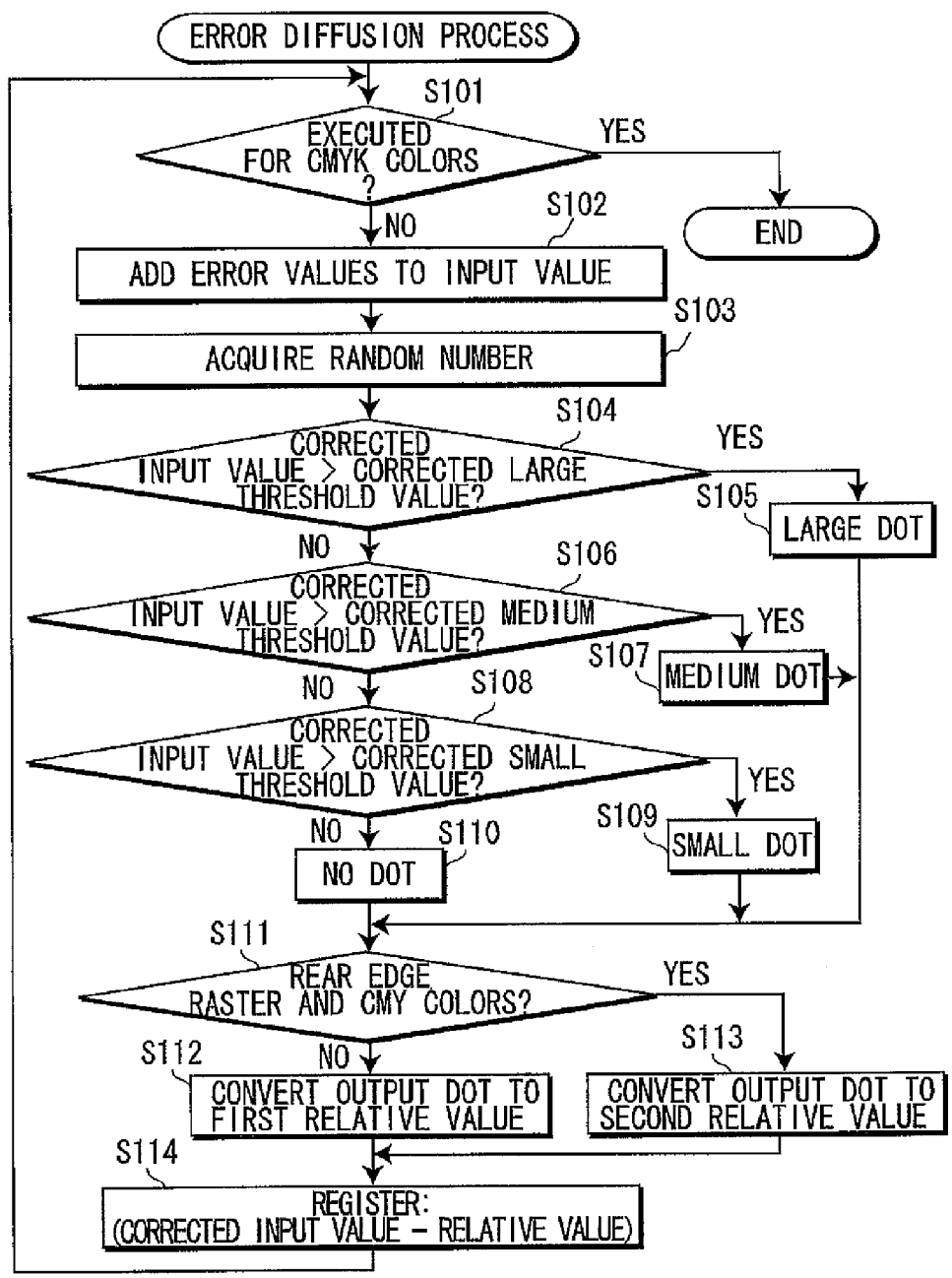
FIG. 5 is a flowchart illustrating an error diffusion processes according to the first embodiment.
Figure 7:
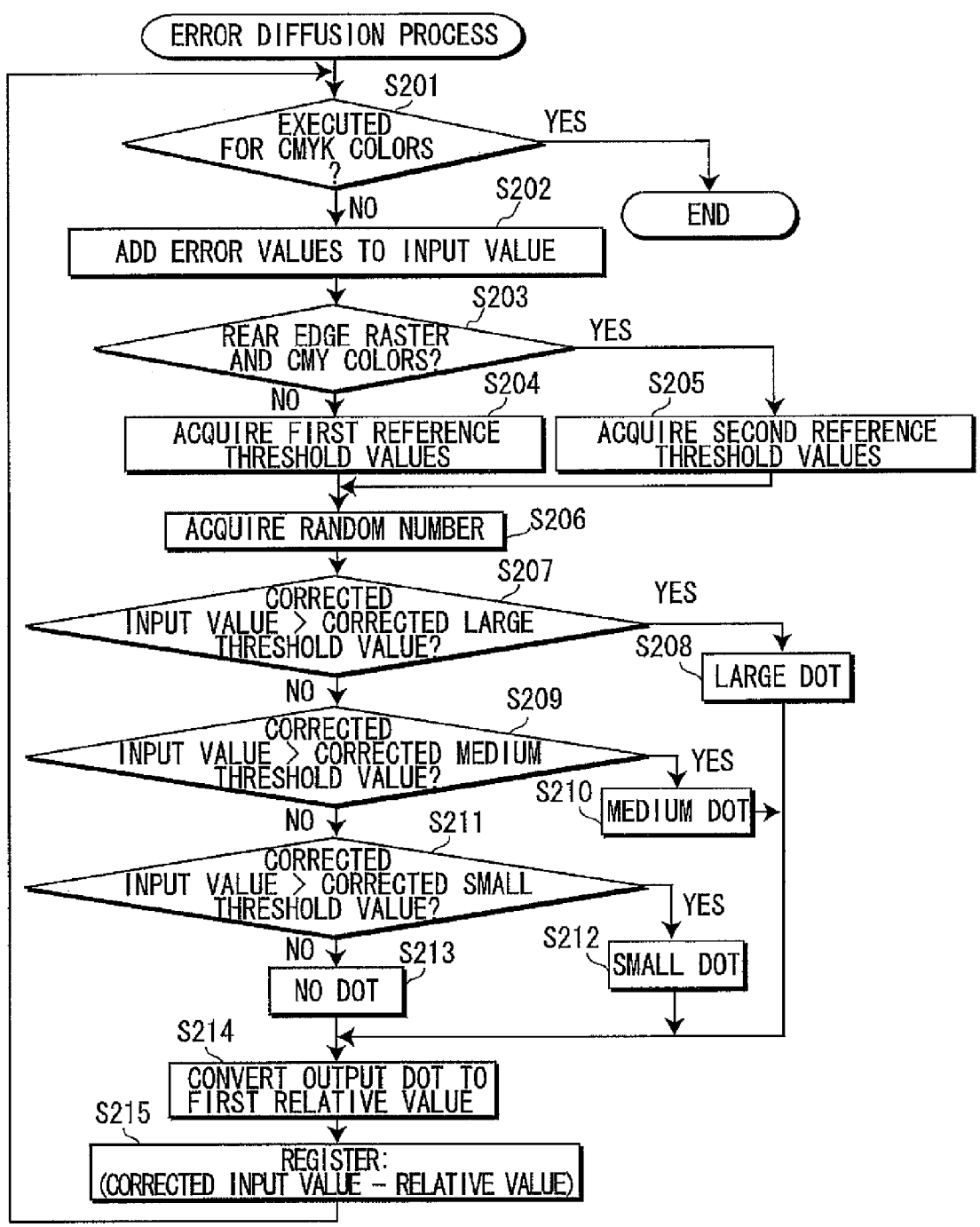
FIG. 7 is a flowchart illustrating an error diffusion processes according to the first embodiment.

FIG. 7 is a flowchart of error diffusion process that the controller 11 of the personal computer 1 performs in place of the above-described error diffusion process of FIG. 5. The process of S201, S202, S206 to S213, and S215 of FIG. 7 are the same as processing of S101 to S110 and S114 of FIG. 5, and only the different process will be described.

In S203, the controller 11 determines whether the target pixel belongs to the rear edge raster of the band and whether the input value to be processed is any one of CMY color values. When the controller 11 determines that the target pixel does not belong to the rear edge raster of the band or that the input value to be processed is K color value (S203: No), the controller 11 advances to S204 and acquires the first reference threshold values (upper column of FIG. 6C) as the reference threshold values. Thereafter, the controller 11 advances to S206.

On the other hand, when the controller 11 determines that the target pixel belongs to the rear edge raster of the band and that the input value to be processed is any one of CMY color values (S203: Yes), the controller 11 advances to S205 and acquires the second reference threshold values (lower column of FIG. 6C) as the reference threshold values. Here, each of the small, medium, and large second reference threshold values are larger than or equal to the corresponding one of the small, medium, and large first reference threshold values. Thereafter, the controller 11 advances to S206.

In S214, the controller 11 converts the output dot of the target pixel into corresponding relative value and thereafter advances to S215. The relative values used in the second embodiment are the same as the first relative values in the first embodiment (FIG. 6C). That is, the relative values used for the first error diffusion process are the same as the relative values used for the second error diffusion process.

2-3. Effect

As described above, according to the second embodiment, the larger reference thresholds are used for the CMY values of the edge image data corresponding to the rear edge raster of the band than for other values (K value of the edge image data or CMYK values of non-edge image data) in the error diffusion process. That is, in the second error diffusion process (the error diffusion process using the second reference threshold values obtained in S205), the lower limit value of the corrected input value that generates large dot is increased as compared to that in the first error diffusion process (the error diffusion process using the first reference threshold values obtained in S204), whereby large dot is unlikely to be generated. The decrease in the rate of occurrence of large dot results in a reduction in the ink use amount. That is, the larger the ink droplet amount of one dot is, the larger the dot size becomes, achieving the higher density. However, the ink droplet amount of one dot is not proportional to the density. For example, in the embodiment, the droplet amounts of large dot, medium dot, and small dot are 16 pl, 5 pl, and 3 pl, respectively, while the density ratio is 10:5:3.6. That is, the higher the percentage of large dot in a given image, the larger the use amount of the ink required for expressing the image. Thus, the decrease in the rate of occurrence of large dot can reduce the ink use amount, thereby reducing the streak that can be generated at the joint between two bands printed through different two main scans.

3. Third Embodiment

3-1. Difference from Print System of First Embodiment

A print system according to a third embodiment is similar to that according to the first embodiment but differs therefrom in the details of the error diffusion process. That is, in the first embodiment, the first relative values are used in the first error diffusion process, and second relative values larger than the first relative values are used in the second error diffusion process. In the third embodiment, random numbers of a first range are used in the first error diffusion process, and random numbers of a second range narrower than the first range are used in the second error diffusion process. Hereinafter, the descriptions the same as the first embodiment are omitted.

3-2, Error Diffusion Process

Figure 8:
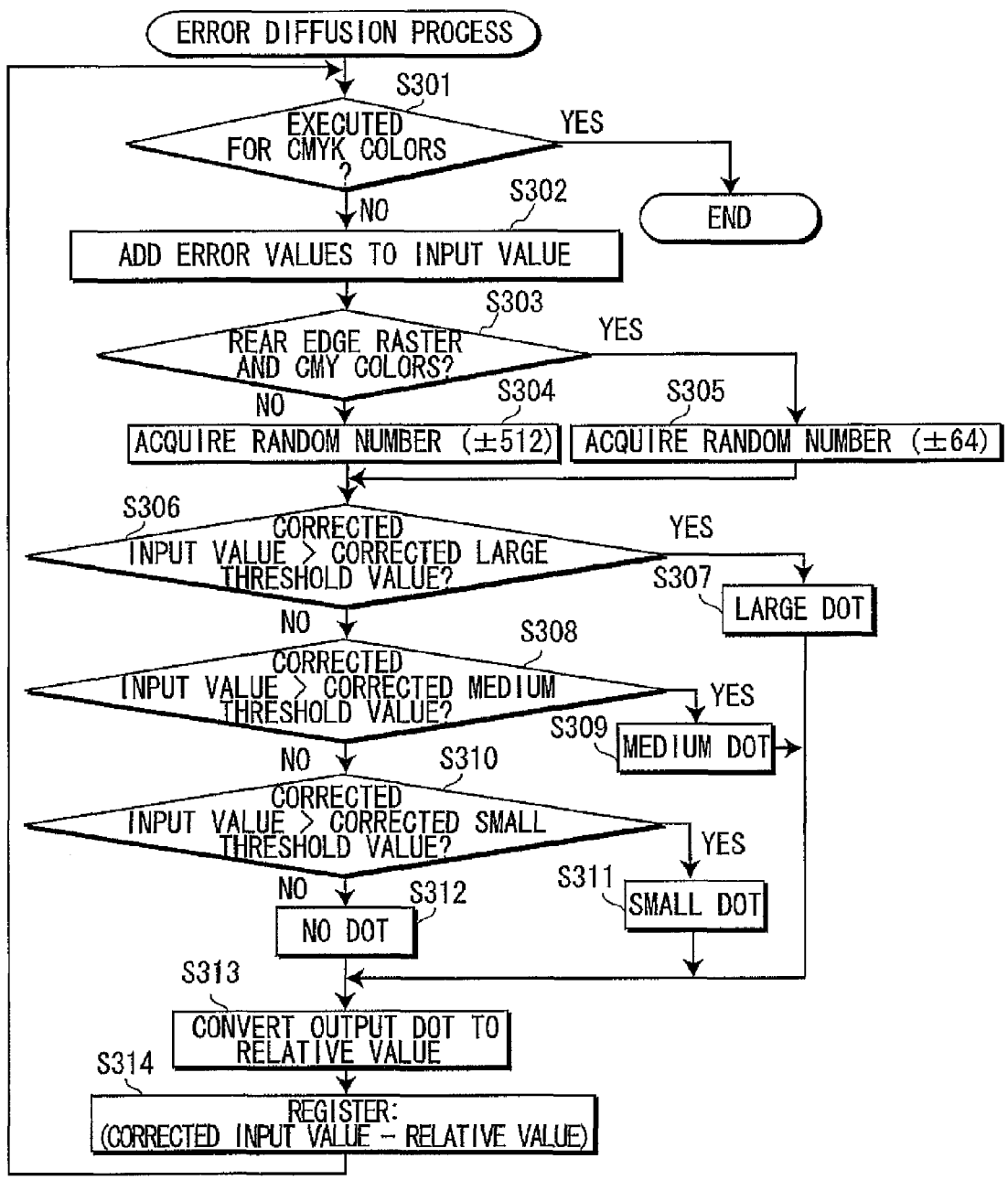
FIG. 8 is a flowchart illustrating an error diffusion processes according to the third embodiment.

FIG. 8 is a flowchart of error diffusion process that the controller 11 of the personal computer 1 performs in place of the above-described error diffusion process of FIG. 5. The process of S301, S302, S306 to S312, and S314 of FIG. 8 are the same as processing of S101, S102, S104 to S110, and S114 of FIG. 5, and only the different process will be described.

In S303, the controller 11 determines whether the target pixel belongs to the rear edge raster of the band and whether the input value to be processed is any one of CMY color values. When the controller 11 determines that the target pixel does not belong to the rear edge raster of the band or that the input value to be processed is K color value (S303: Yes), the controller 11 advances to S304 and acquires the random number (first random number) occurring within an amplitude range of ±512 (−512 to +512). Thereafter, the controller 11 advances to S306. Note that when the amplitude of the random number is set to a value larger than the maximum width between the relative values of adjacent dot sizes, dots of different sizes may easily be mixed. In the third embodiment, the same relative values as the first relative values (small dot: 91, medium dot: 127, and large dot:255) in the first embodiment are used, and thus the maximum width between the relative values of adjacent dot sizes is 128 (=255-127).

On the other hand, when the controller 11 determines that the target pixel belongs to the rear edge raster of the band and that the input value to be processed is any one of CMY color values (S303: No), the controller 11 advances to S305 and acquires the random number (second random number) occurring within an amplitude range of ±64 (−64 to +64). That is, the median values of the first and second random numbers are equal to each other (zero). Thereafter, the controller 11 advances to S306.

In S313, the controller 11 converts the output dot of the target pixel into the corresponding relative value and thereafter advances to S314.

3-3. Effect

As described above, according to the third embodiment, the random number smaller in amplitude (narrower in range) is used for the CMY values of the edge image data corresponding to the rear edge raster of the band than for other values (K value of the edge image data or CMYK values of non-edge image data) in the error diffusion process. The use of the random number tends to increase the rate of occurrence of large dot in the printed image as compared to a case where the random number is not used. Further, the large random number amplitude tends to increase the rate of occurrence of large dot in the printed image as compared to the small random number amplitude. Thus, the size of the dot generated in the second error diffusion process (the error diffusion process using the random number obtained in S305) becomes less likely to vary than that of dot generated in the first error diffusion process (the error diffusion process using the random number obtained in S304) (dots of different sizes are unlikely to be mixed) to decrease the rate of occurrence of large dot, thereby reducing ink use amount, which in turn reduces the streak that can be generated at the joint between two bands printed through different two main scans.

As described above, the use of the random number tends to increase the rate of occurrence of large dot in the printed image as compared to a case where the random number is not used. Thus, for the CMY values of the edge image data corresponding to the rear edge raster of the band, the same effect can be obtained even in the case where the random number is not added to the reference threshold value (in other words, even in the case where the amplitude of the random number to be acquired in S305 is set to zero).

4. Fourth Embodiment

4-1. Difference from Print System of First Embodiment

A print system according to a fourth embodiment differs from that of the first embodiment in that the error diffusion process in which dot utilization rate is adjusted for each dot size (large dot, medium dot, and small dot) is performed. That is, in the fourth embodiment, the error buffer is provided for each dot size to manage the error value independently, thereby adjusting the dot utilization rate. Specifically, the error diffusion process is performed as follows.

(1) Based on a table representing the relationship between the input value (gradation value) and a segmental gradation value for each dot size, the input value of the target pixel is segmental into segmental gradation values.

(2) On a dot size basis, the segmental gradation value of the target pixel and collected error values of the surrounding pixels are added to each other to acquire a corrected segmental gradation value.

(3) On a dot size basis, the corrected segmental gradation value and a threshold value are compared and the output dot of the target pixel is determined based on a result of the comparison.

(4) On a dot size basis, the corrected segmental gradation value and a relative value (relative value per dot size which hereinafter referred to as "size-based relative value") corresponding to the output dot are used to calculate the error value of the target pixel for each dot size.

Figure 9A:
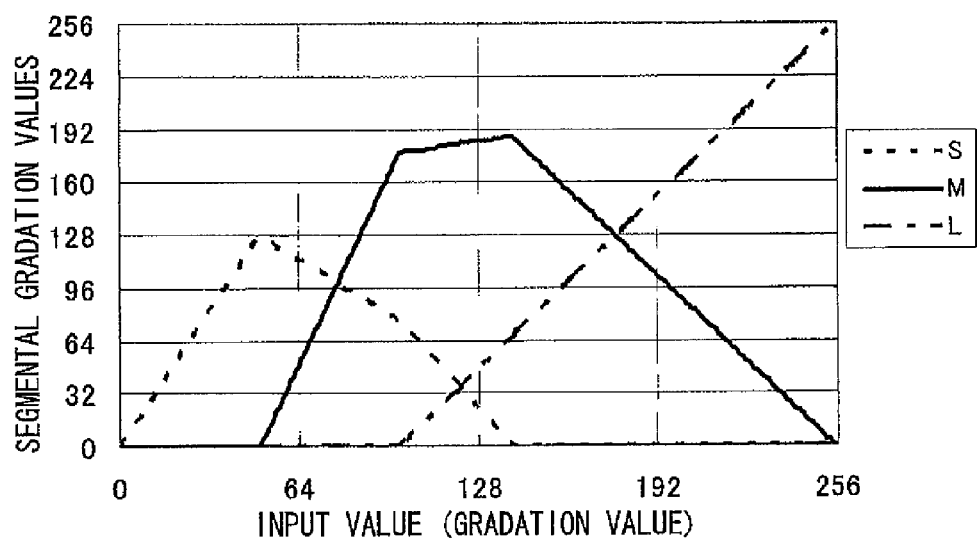
FIG. 9A is a first table correlating input value to segmental gradation values.
Figure 9B:
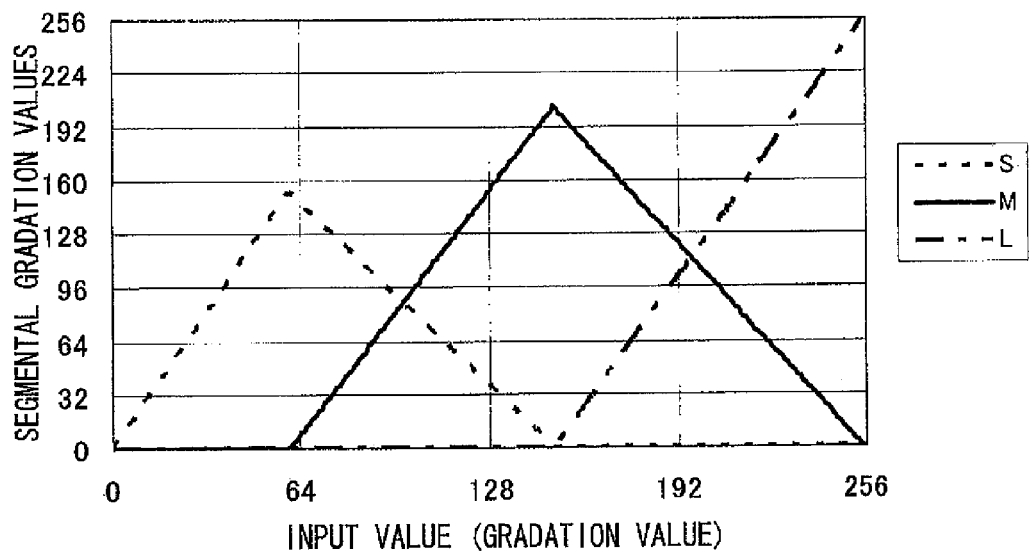
FIG. 9B is a second table correlating input value to segmental gradation values.

FIGS. 9A and 9B are tables each representing the relationship between the input value (gradation value) and segmental gradation values set for small dot (S), medium dot (M), and large dot (L). In these tables, the segmental gradation value corresponds to size-based dot utilization rate. Specifically, the segmental gradation value of large dot with respect to each input value is set lower in a second table (FIG. 9B) than in a first table (FIG. 9A). Further, the segmental gradation values of medium dot and small dot are changed with a change in the segmental gradation value of the large dot so as to express the same density with a specific input value. That is, the use of the second table reduces the large dot utilization rate as compared to the use of the first table. Thus, in the above step (1), the first table is used in the first error diffusion process and the second table is used in the second error diffusion table. Hereinafter, the descriptions the same as the first embodiment are omitted.

4-2. Error Diffusion Process

Figure 10:
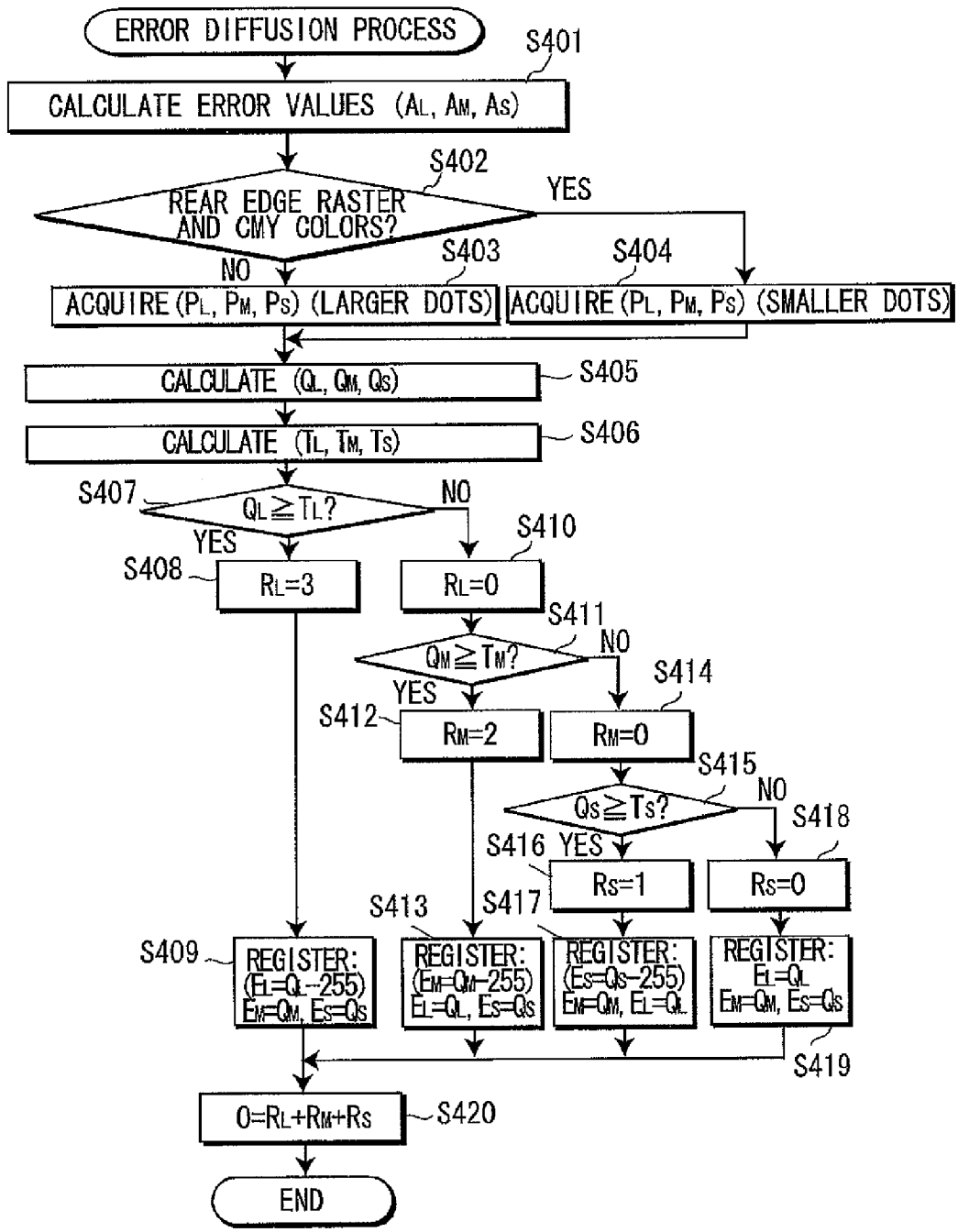
FIG. 10 is a flowchart illustrating an error diffusion processes according to the fourth embodiment.

FIG. 10 is a flowchart of error diffusion process that the controller 11 of the personal computer 1 performs in place of the above-described error diffusion process of FIG. 5. In the error diffusion process of FIG. 10, pixels constituting image data to be processed are sequentially selected as a target pixel (pixel to be processed), and the process is executed for each color value of the target pixel.

After starting the error diffusion process of FIG. 10, in S401 the controller 11 uses the error matrix to collect error values $A_L$, $A_M$, and $A_S$ (hereinafter, referred to as "collected error values") for each of large dot, medium dot, and small dot from the error buffer provided for each dot size. Subscripts L, M, and S indicate values for large dot, medium dot, and small dot, respectively.

Subsequently, in S402, the controller 11 determines whether the target pixel belongs to the rear edge raster of the band and whether the input value to be processed is any one of CMY color values. When the controller 11 determines that the target pixel does not belong to the rear edge raster of the band or that the input value to be processed is K color value (S402: No), the controller 11 advances to S403 and resolves the input value (gradation value) of the target pixel for each dot size to obtain segmental gradation values $P_L$, $P_M$, and $P_S$ based on the first table (FIG. 9A). That is, the segmental gradation values $P_L$, $P_M$, and $P_S$ are obtained based on the input value by referring to the first table. Thereafter, the controller 11 advances to S405.

On the other hand, when the controller 11 determines that the target pixel belongs to the rear edge raster of the band and that the input value to be processed is any one of CMY color values (S402: Yes), the controller 11 advances to S404 and dissolves the input value (gradation value) of the target pixel for each dot size to obtain segmental gradation values $P_L$, $P_M$, and $P_S$ based on the second table (FIG. 9B) in which the segmental gradation value of large dot is set lower than that in the first table. That is, the segmental gradation values $P_L$, $P_M$, and $P_S$ are obtained based on the input value by referring to the second table. Thereafter, the controller 11 advances to S405.

In S405, the controller 11 adds the collected error values $A_L$, $A_M$, and $A_S$ to the segmental gradation values $P_L$, $P_M$, and $P_S$ to calculate corrected segmental gradation values $Q_L$, $Q_M$, and $Q_S$ for respective dot sizes.

Subsequently, in S406, the controller 11 calculates threshold values $T_L$, $T_M$, and $T_S$ for respective dot sizes. In the second embodiment, a previously set value (e.g., 1) is set to $T_L$, $T_M$, and $T_S$.

Subsequently, in S407, the controller 11 determines whether the corrected segmental gradation value $Q_L$ of large dot is larger than or equal to the threshold value $T_L$ of large dot. When the controller 11 determines that the corrected segmental gradation value $Q_L$ of large dot is larger than or equal to the threshold value $T_L$ of large dot, the controller 11 advances to S408 and sets output values $R_L$ of large dot to 3, $R_M$ of medium dot to 0, and $R_S$ of small dot to 0, which means that large dot is determined as the output dot as described later (S420). In S409, the controller 11 registers the error value of the target pixel in the error buffer for each dot size. Specifically, a large dot error value $E_L=Q_L-255$, a medium dot error value $E_M=Q_M$, and a small dot error value $E_S=Q_S$ are registered. That is, for large dot, a value obtained by subtracting the size-based relative value (255) from the corrected segmental gradation value $Q_L$ is registered as the error value; for medium and small dots, the corrected segmental gradation values $Q_M$ and $Q_S$ are registered without change as the error values. Thereafter, the controller 11 advances to S420.

On the other hand, when the controller 11 determines that the corrected segmental gradation value $Q_L$ of large dot is less than the threshold $T_L$ of large dot (S407: No), the controller 11 advances to S410 and sets an output value $R_L$ of large dot to 0. Then, in S411, the controller 11 determines whether the corrected segmental gradation value $Q_M$ of medium dot larger than or equal to the threshold $T_M$ of medium dot. When the controller 11 determines that the corrected segmental gradation value $Q_M$ of medium dot is larger than or equal to the threshold $T_M$ of medium dot (S411: Yes), the controller 11 advances to S412 and sets output values $R_M$ to of medium dot to 2 and $R_S$ of small dot to 0, which indicates that medium dot is set as the output dot as described later (S420). In S413, the controller 11 registers the error value of the target pixel in the error buffer for each dot size. Specifically, a medium dot error value $E_M=Q_M-255$, a large dot error value $E_L=Q_L$, and a small dot error value $E_S=Q_S$ are registered. That is, for medium dot, a value obtained by subtracting the size-based relative value (255) from the corrected segmental gradation value $Q_M$ is registered as the error value; for large and small dots, the corrected segmental gradation values $Q_L$ and $Q_S$ are registered without change as the error values. Thereafter, the controller 11 advances to S420.

On the other hand, when the controller 11 determines that the corrected segmental gradation value $Q_M$ of medium dot is less than the threshold $T_M$ of medium dot (S411: No), the controller 11 advances to S414 and sets an output value $R_M$ of medium dot to 0. Then, in S415, the controller 11 determines whether the corrected segmental gradation value $Q_S$ of small dot is larger than or equal to the threshold $T_S$ of small dot. When the controller 11 determines that the corrected segmental gradation value $Q_S$ of small dot is larger than or equal to the threshold $T_S$ of small dot (S415: Yes), the controller 11 advances to S416 and sets an output value $R_S$ of small dot to 1, which indicates that small dot is set as the output dot as described later (S420). In S417, the controller 11 registers the error value of the target pixel in the error buffer for each dot size. Specifically, a small dot error value $E_S=Q_S-255$, a large dot error value $E_L=Q_L$, and a medium dot error value $E_M=Q_M$ are registered. That is, for small dot, a value obtained by subtracting the size-based relative value (255) from the corrected segmental gradation value $Q_S$ is registered as the error value; for large and medium dots, the corrected segmental gradation values $Q_L$ and $Q_M$ are registered without change as the error values. Thereafter, the controller 11 advances to S420.

On the other hand, when the controller 11 determines that the corrected segmental gradation value $Q_S$ of small dot is less than the threshold $T_S$ of small dot (S415: No), the controller 11 advances to S418 and sets an output value $R_S$ of small dot to 0, which indicates that no dot is set as the output dot as described later (S420). In S419, the controller 11 registers the error value of the target pixel in the error buffer for each dot size. Specifically, a large dot error value $E_L=Q_L$, a medium dot error value $E_M=Q_M$, and a small dot error value $E_S=Q_S$ are registered. That is, for all large, medium, and small dots, the corrected segmental gradation values $Q_L$, $Q_M$, and $Q_S$ are registered without change as the error values. Thereafter, the controller 11 advances to S420.

In S420, the controller 11 determines the output dot of the target pixel based on an total sum O of the output values $R_L$, $R_M$, and $R_S$ for respective dot sizes. Specifically, when the total sum O is 0, no dot is set as the output dot; when the total sum O is 1, small dot is set; when the total sum O is 2, medium dot is set; and when the total sum O is 3, large dot is set. Thereafter, the controller 11 ends the error diffusion process of FIG. 10.

4-3. Effect

As described above, according to the fourth embodiment, the rate of occurrence of large dot in the image generated in the second error diffusion process (the error diffusion process using $P_L$, $P_M$, and $P_S$ obtained in S405) is decreased as compared to that generated in the first error diffusion process (the error diffusion process using $P_L$, $P_M$, and $P_S$ obtained in S403) to reduce the ink use amount. Therefore, the streak that can be generated at the joint between two bands printed through different two main scans can be reduced.

4. Variations

While the invention has been described in detail with reference to the embodiments thereof, it would be apparent to those skilled in the art that various changes and modifications may be made therein without departing from the scope of the invention.

(1) In the above respective embodiments, a description has been made assuming that the one-pass printing in which the streak is particularly easily generated is adopted. However, the above error diffusion process reducing the ink use amount for the rear edge raster in the band is effective also for multi-pass printing in which the paper sheet is conveyed by a distance smaller than the nozzle width per a single main scanning (one pass) of the print head 27 and thus printing of an image having a predetermined area is completed by a plurality of main scans (multi pass). For example, as illustrated in FIG. 11A, the streak may be generated in the joint between two adjacent bands also in two-pass printing. Further, as in the case of FIG. 11A in which the paper conveyance amount in the sub-scanning direction is even (same length), the streak may be generated even in the case illustrated in FIG. 11B where the paper conveyance amount in the sub-scanning direction is uneven. In these cases shown in FIGS. 11A and 11B, the error diffusion process reducing the ink amount is performed on line image data that is corresponding to an upstream line in a sub-scanning direction of an adjacent line to be printed in a next pass, for example. Although the print direction is changed alternately in the examples of FIGS. 11A and 11B, the same can be said for a case where the print direction is not changed. Incidentally, although the band areas are displaced from each other in horizontal direction in these drawings so as to make a difference between the passes easier to understand, actual horizontal positions of the band areas coincide with each other.

(2) Although the error diffusion process that reduces the ink amount used for printing of the rear edge raster of the band is exemplified in the above respective embodiments, the invention is not limited to this. For example, instead of or together with the rear edge raster of the band, the front edge raster of the band (raster at the edge of a first band on the side adjacent to a second band to be printed earlier than the first band) may undergo an ink amount reduction. Further, the error diffusion process that reduces the ink amount may be performed not only for image data corresponding to one line but also for image data corresponding to a plurality of lines. However, when the error diffusion process that reduces the ink amount is performed only for image data corresponding to one line as in the above embodiments, the error diffusion process can be achieved in a shorter time than in the case where the error diffusion process that reduces the ink amount is performed for image data corresponding to a plurality of lines.

(3) In the above respective embodiments, the printer 2 that can express four gradation levels is exemplified. Instead, a printer that can express, e.g., two gradation levels or three or more gradation levels may be used.

(4) Although the error diffusion process is executed on the personal computer 1 side in the above respective embodiments, the invention is not limited to this, but the error diffusion process may be executed on the printer 2 side. In this case, the print data supply process (S14) is a process to supply the print data generated in the printer 2 to the print execution section 26.

(5) At least part of processes shown in FIGS. 3, 4, 5, 7, 8, and 10 may be performed a specific hardware, such as ASIC.

What is claimed is:

1. An image processing apparatus comprising:
    a processor configured to function as:
        a color conversion unit configured to generate color converted image data by performing a color conversion process on original image data, the color converted image data including part data corresponding to a unit region to be printed on a recording sheet, the unit region to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning direction;
        an error diffusion process performing unit configured to generate print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and
        a supplying unit configured to supply the print data,
    wherein the color converted image data includes a plurality of gradation values, each gradation value corresponding to a pixel in the image, and
    wherein the error diffusion process performing unit includes:
        an error value acquiring unit configured to acquire an error value;
        a corrected gradation value acquiring unit configured to acquire a corrected gradation value of a target pixel in the image by adding at least one error value of at least one peripheral pixel around the target pixel to a gradation value of the target pixel; and
        a determining unit configured to determine dot data of the target pixel by comparing the gradation value of the target pixel with a threshold value, the dot data indicating whether a dot having one of a plurality of sizes is formed or not,
    wherein the error value acquiring unit is configured to acquire the error value of the target pixel based on the corrected gradation value and a reference gradation value corresponding to the dot data of the target pixel,
    wherein the threshold value is set by adding a random number to a reference threshold value, and
    wherein the error diffusion process includes performing the first error diffusion process by using, as the random number, a first random number within a first range whereas the error diffusion process includes performing the second error diffusion process by using, as the random number, the second random number within a second range narrower than the first range.

2. An image processing apparatus comprising:
    a processor configured to function as:
        a color conversion unit configured to generate color converted image data by performing a color conversion process on original image data, the color converted image data including part data corresponding to a unit region to be printed on a recording sheet, the unit region being to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning;
        an error diffusion process performing unit configured to generate print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and
        a supplying unit configured to supply the print data,
    wherein the color converted image data includes a plurality of gradation values, each gradation value corresponding to a pixel in the image;
    wherein the error diffusion process performing unit includes:
        an error value acquiring unit configured to acquire an error value;
        a corrected gradation value acquiring unit configured to acquire a corrected gradation value of a target pixel in the image by adding at least one error value of at least one peripheral pixel around the target pixel to a gradation value of the target pixel; and a determining unit configured to determine dot data of the target pixel by comparing the gradation value of the target pixel with a threshold value, the dot data indicating whether a dot having one of a plurality of sizes is formed or not, wherein the error value acquiring unit is configured to acquire the error value of the target pixel based on the corrected gradation value and a reference gradation value corresponding to the dot data of the target pixel; and wherein the error diffusion process includes performing the first error diffusion process by setting the threshold value to a value obtained by adding a reference threshold value to a random number whereas the error diffusion process includes performing the second error diffusion process by setting the threshold value to the reference threshold value.

3. An image processing apparatus comprising:

a processor configured to function as:

a color conversion unit configured to generate color converted image data by performing a color conversion process on original image data, the color converted image data including part data corresponding to a unit region to be printed on a recording sheet, the unit region being to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning;

an error diffusion process performing unit configured to generate print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and a supplying unit configured to supply the print data, wherein the color converted image data includes a plurality of gradation values, each gradation value corresponding to a pixel in the image;

wherein the error diffusion process performing unit includes:

an error value acquiring unit configured to acquire an error value of the pixel for each of a plurality of dot sizes;

a first acquiring unit configured to acquire, for each of the plurality of dot sizes, segmental gradation values of the target pixel corresponding to the gradation value of a target pixel based on a reference table correlating the gradation value to the segmental gradation values;

a second acquiring unit configured to acquire corrected segmental gradation values by adding, for each of the plurality of dot sizes, the error value of at least one peripheral pixel around the target pixel to the segmental gradation value; and a determining unit configured to determine dot data of the target pixel by comparing the segmental gradation values of the target pixel with a threshold value, the dot data indicating whether a dot having one of the plurality of sizes is formed or not, wherein the error value acquiring unit is configured to acquire the error values of the target pixel based on the segmental gradation values and reference gradation values corresponding to the dot data of the target pixel, and wherein the error diffusion process includes performing the first error diffusion process by using a first table as the reference table whereas the error diffusion process includes performing the second error diffusion process by using, as the reference table, a second table in which the segmental gradation value corresponding to a maximum dot size among the plurality of dot sizes is smaller than the segmental gradation value corresponding to the maximum dot size specified by the first table.

4. The image processing apparatus according to claim 1, wherein the edge data corresponding to an edge line of the unit region in which dots is to be arranged in the main scanning direction.

5. The image processing apparatus according to claim 1, wherein the color converted image data has a plurality of gradation values for each of a plurality of ink colors used in a printing operation; and wherein the error diffusion process performing unit includes performing the first error diffusion process on a gradation value among the plurality of gradation values corresponding to an ink color of pigment ink whereas the second error diffusion process includes performing the second error diffusion process on the gradation value among the plurality of gradation values corresponding to an ink color of dye ink.

6. A non-transitory computer readable storage medium storing a set of program instructions to be installed on and executed by a computer, the program instructions comprising instructions for:

(a) generating color converted image data by performing a color conversion process on original image data, the color converted image data including part data corresponding to a unit region to be printed on a recording sheet, the unit region to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning direction;

(b) generating print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and (c) supplying the print data, wherein the color converted image data includes a plurality of gradation values, each gradation value corresponding to a pixel in the image, wherein the instructions for (b) generating include instructions for:

(b-1) acquiring an error value;

(b-2) acquiring a corrected gradation value of a target pixel in the image by adding at least one error value of at least one peripheral pixel around the target pixel to a gradation value of the target pixel; and (b-3) determining dot data of the target pixel by comparing the gradation value of the target pixel with a threshold value, the dot data indicating whether a dot having one of a plurality of sizes is formed or not, wherein the instructions for (b-1) acquiring includes acquiring the error value of the target pixel based on the corrected gradation value and a reference gradation value corresponding to the dot data of the target pixel, wherein the threshold value is set by adding a random number to a reference threshold value, and wherein the error diffusion process includes performing the first error diffusion process by using, as the random number, a first random number within a first range whereas the error diffusion process includes performing the second error diffusion process by using, as the random number, the second random number within a second range narrower than the first range.

7. A non-transitory computer readable storage medium storing a set of program instructions to be installed on and executed by a computer, the program instructions comprising instructions for:

(a) generating color converted image data by performing a color conversion process on original image data, the color converted image data including part data corresponding to a unit region to be printed on a recording sheet, the unit region to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning direction;

(b) generating print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and (c) supplying the print data, wherein the color converted image data includes a plurality of gradation values, each gradation value corresponding to a pixel in the image, wherein the instructions for (b) generating include instructions for:

(b-1) acquiring an error value;

(b-2) acquiring a corrected gradation value of a target pixel in the image by adding at least one error value of at least one peripheral pixel around the target pixel to a gradation value of the target pixel; and (b-3) determining dot data of the target pixel by comparing the gradation value of the target pixel with a threshold value, the dot data indicating whether a dot having one of a plurality of sizes is formed or not, wherein the instructions for (b-1) acquiring includes acquiring the error value of the target pixel based on the corrected gradation value and a reference gradation value corresponding to the dot data of the target pixel; and wherein the error diffusion process includes performing the first error diffusion process by setting the threshold value to a value obtained by adding a reference threshold value to a random number whereas the error diffusion process includes performing the second error diffusion process by setting the threshold value to the reference threshold value.

8. A non-transitory computer readable storage medium storing a set of program instructions to be installed on and executed by a computer, the program instructions comprising instructions for:

(a) generating color converted image data by performing a color conversion process on original image data, the color converted image data including part data corresponding to a unit region to be printed on a recording sheet, the unit region to be printed by a single main scanning in which a print head moves forward or backward in a main scanning direction, the unit region having a band-like shape extending in a main scanning direction, the unit region including an edge region having a band-like shape extending in the main scanning direction and a remaining region different from the edge region, the remaining region having a band-like shape extending in the main scanning direction, the part data including edge data corresponding to the edge region of the unit region and remaining data corresponding to the remaining region of the unit region, and the edge region abutting another unit region that is to be printed by another single main scanning in which the print head moves forward or backward in the main scanning direction;

(b) generating print data by performing an error diffusion process on the color converted image data, the error diffusion process including performing a first error diffusion process on the remaining data and performing a second error diffusion process on the edge data such that an amount of ink to be used in the edge region by performing the second error diffusion process on the edge data is reduced compared to an amount of ink to be used in the edge region by performing the first error diffusion process on the edge data; and (c) supplying the print data, wherein the color converted image data includes a plurality of gradation values, each gradation value corresponding to a pixel in the image, wherein the instructions for (b) generating include instructions for:
- (b-1) acquiring an error value of the pixel for each of a plurality of dot sizes;
- (b-2) acquiring, for each of the plurality of dot sizes, segmental gradation values of the target pixel corresponding to the gradation value of a target pixel based on a reference table correlating the gradation value to the segmental gradation values;
- (b-3) acquiring corrected segmental gradation values by adding, for each of the plurality of dot sizes, the error value of at least one peripheral pixel around the target pixel to the segmental gradation value; and
- (b-4) determining dot data of the target pixel by comparing the segmental gradation values of the target pixel with a threshold value, the dot data indicating whether a dot having one of the plurality of sizes is formed or not, wherein the instructions for (b-1) acquiring includes acquiring the error values of the target pixel based on the segmental gradation values and reference gradation values corresponding to the dot data of the target pixel, and wherein the error diffusion process includes performing the first error diffusion process by using a first table as the reference table whereas the error diffusion process includes performing the second error diffusion process by using, as the reference table, a second table in which the segmental gradation value corresponding to a maximum dot size among the plurality of dot sizes is smaller than the segmental gradation value corresponding to the maximum dot size specified by the first table.

* * * * *